March 2, 1937.  J. T. CRANE  2,072,544

MACHINE FOR MAKING PACKING

Original Filed Jan. 2, 1932  4 Sheets—Sheet 1

Inventor:
John T. Crane
By Jones, Addington, Ames & Seibold
Attys

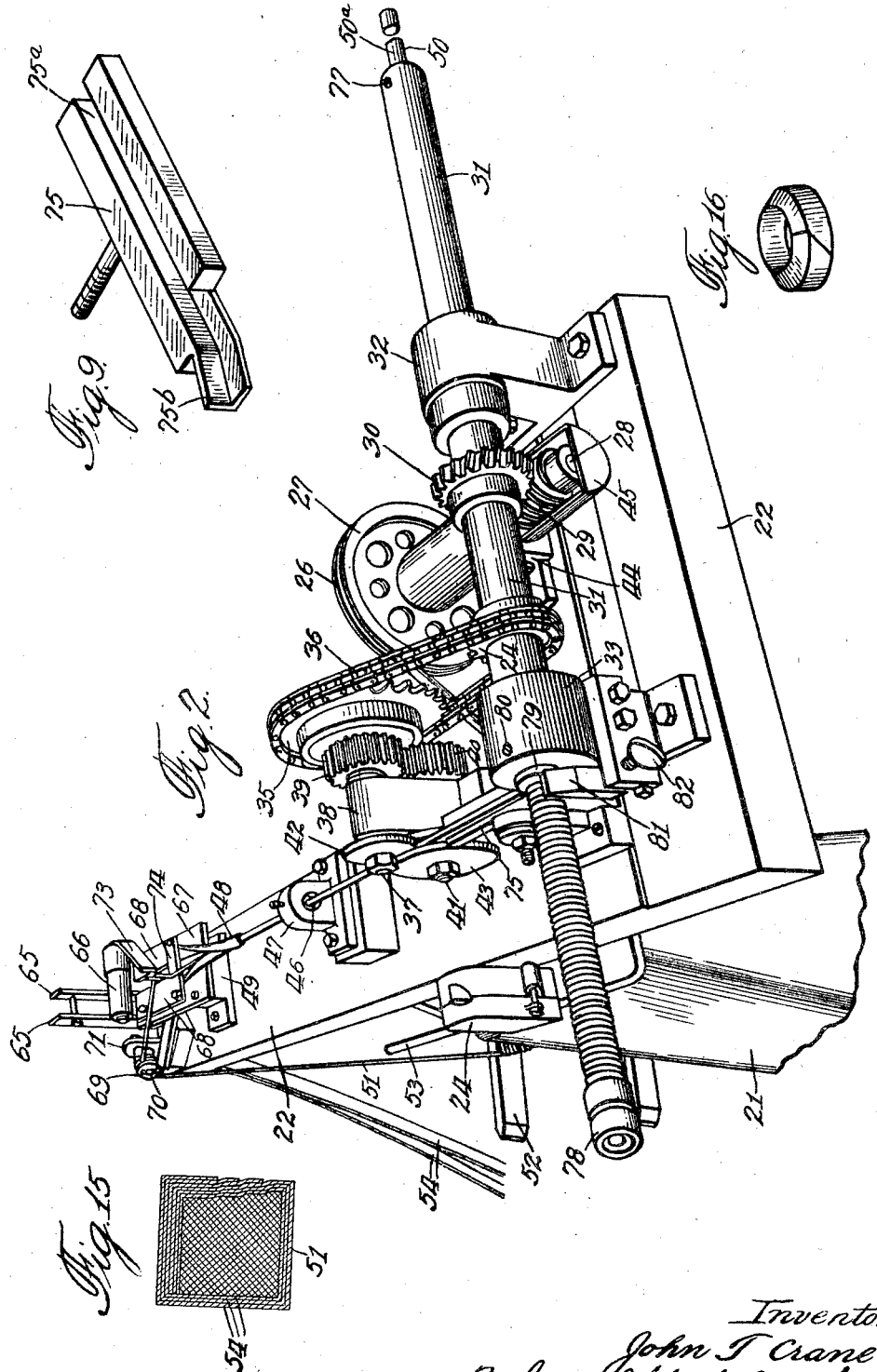

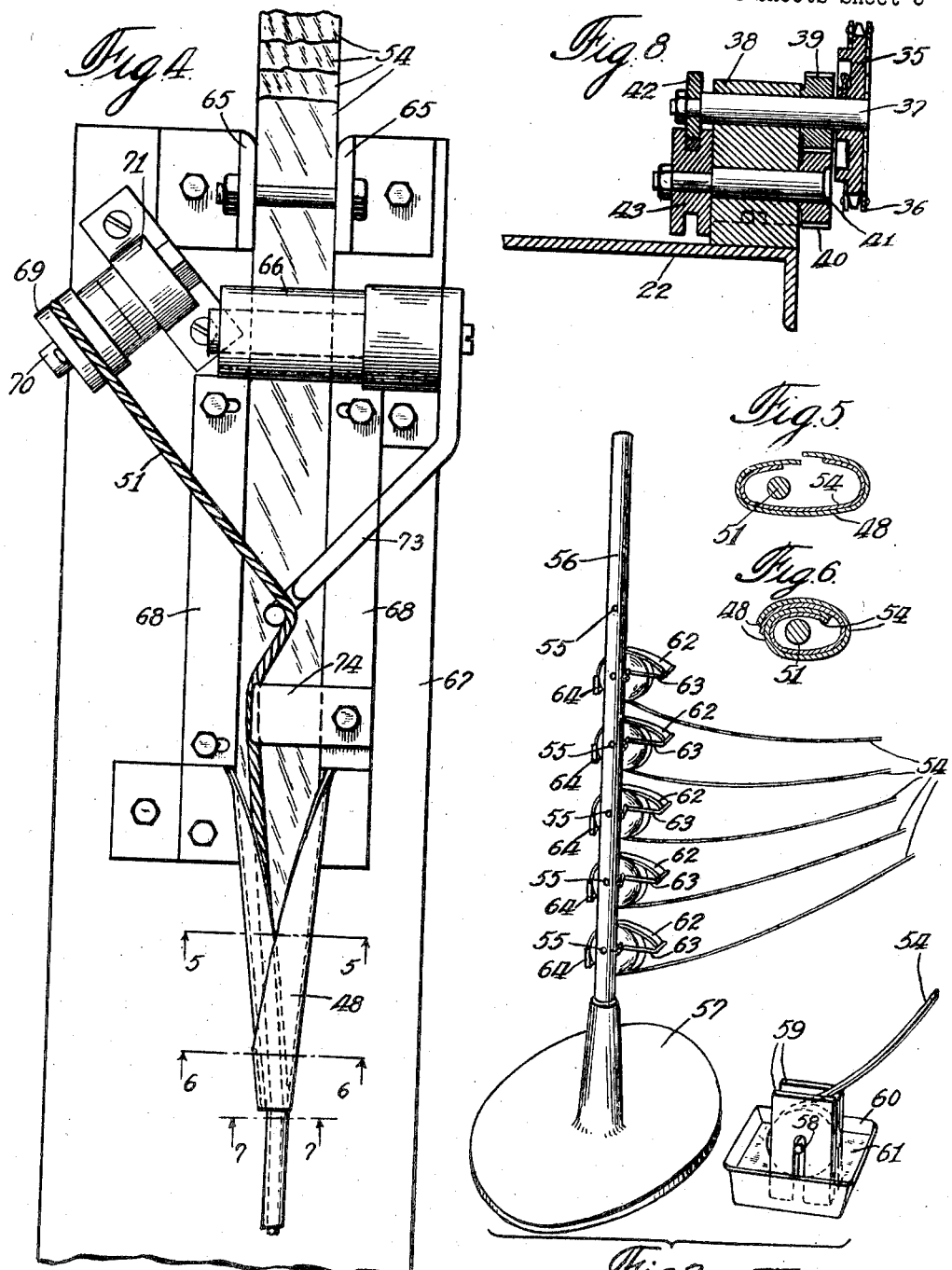

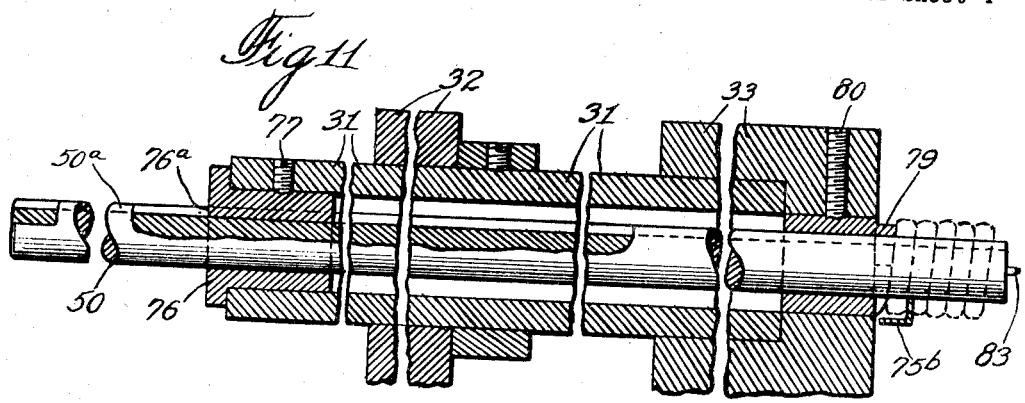
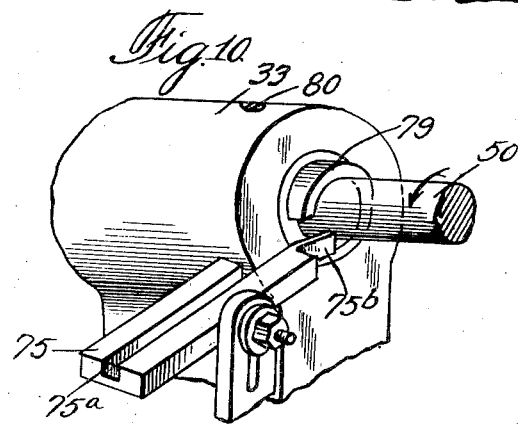
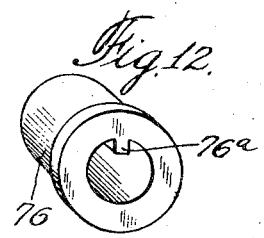
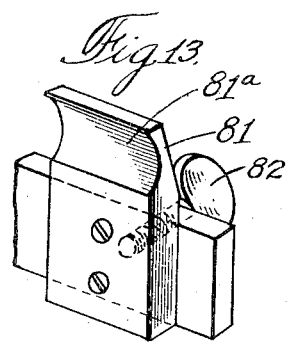
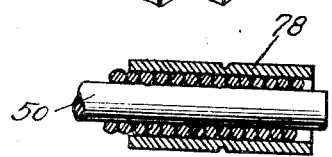

Patented Mar. 2, 1937

2,072,544

UNITED STATES PATENT OFFICE 2,072,544

MACHINE FOR MAKING PACKING

John T. Crane, Maywood, Ill., assignor to Felt Products Mfg. Co., Chicago, Ill., a corporation of Illinois Original application January 2, 1932, Serial No. 584,547. Divided and this application February 15, 1933, Serial No. 656,961

8 Claims. (Cl. 154—1)

This application is a division of my copending application, Serial No. 584,547, filed January 2, 1932.

This invention relates to improvements in machines for making packing, and has particular relation to the manufacture of fluid-tight packing such as is used in pumps and the like.

The primary object of the invention is to provide a machine for making an improved form of packing consisting of a core of fibrous material, or the like, and an outer covering of metallic foil folded around said core.

Other objects and advantages of the invention will appear from the following detailed description taken in conjunction with the accompanying drawings, in which:

Fig. 2 is a perspective view of the upper portion of the machine shown in Fig. 1, taken from a different angle;

Fig. 3 is a perspective view of a device for supporting rolls of metallic foil, to be used in conjunction with the machine shown in Figs. 1 and 2;

Fig. 4 is a fragmentary top plan view of a portion of the machine shown in Figs. 1 and 2;

Fig. 5 is a fragmentary transverse sectional view taken on the line 5—5 of Fig. 4;

Fig. 6 is a fragmentary transverse sectional view taken on the line 6—6 of Fig. 4;

Fig. 7 is a fragmentary transverse sectional view taken on the line 7—7 of Fig. 4;

Fig. 8 is a fragmentary transverse sectional view taken on the line 8—8 of Fig. 1;

Fig. 9 is a perspective view of a guiding device included in the machine shown in Figs. 1 and 2;

Fig. 10 is a fragmentary perspective view of a portion of the machine, including the guiding device shown in Fig. 9, and other portions of the machine cooperating therewith;

Fig. 11 is a fragmentary sectional view taken on the line 11—11 of Fig. 1, certain of the parts being broken away and omitted to give a clearer view of the essential parts;

Fig. 12 is a detail perspective view of a keyed collar member embodied in the machine;

Fig. 13 is a fragmentary perspective view showing another guiding member embodied in the machine;

Fig. 14 is a fragmentary sectional view taken on the line 14—14 of Fig. 1;

Fig. 15 is an enlarged transverse sectional view of a completed section of packing made according to the invention; and Fig. 16 is a perspective view of a completed packing member made according to the invention and formed into a ring such as is suitable for use in the packing glands of pumps and the like.

Figure 1:
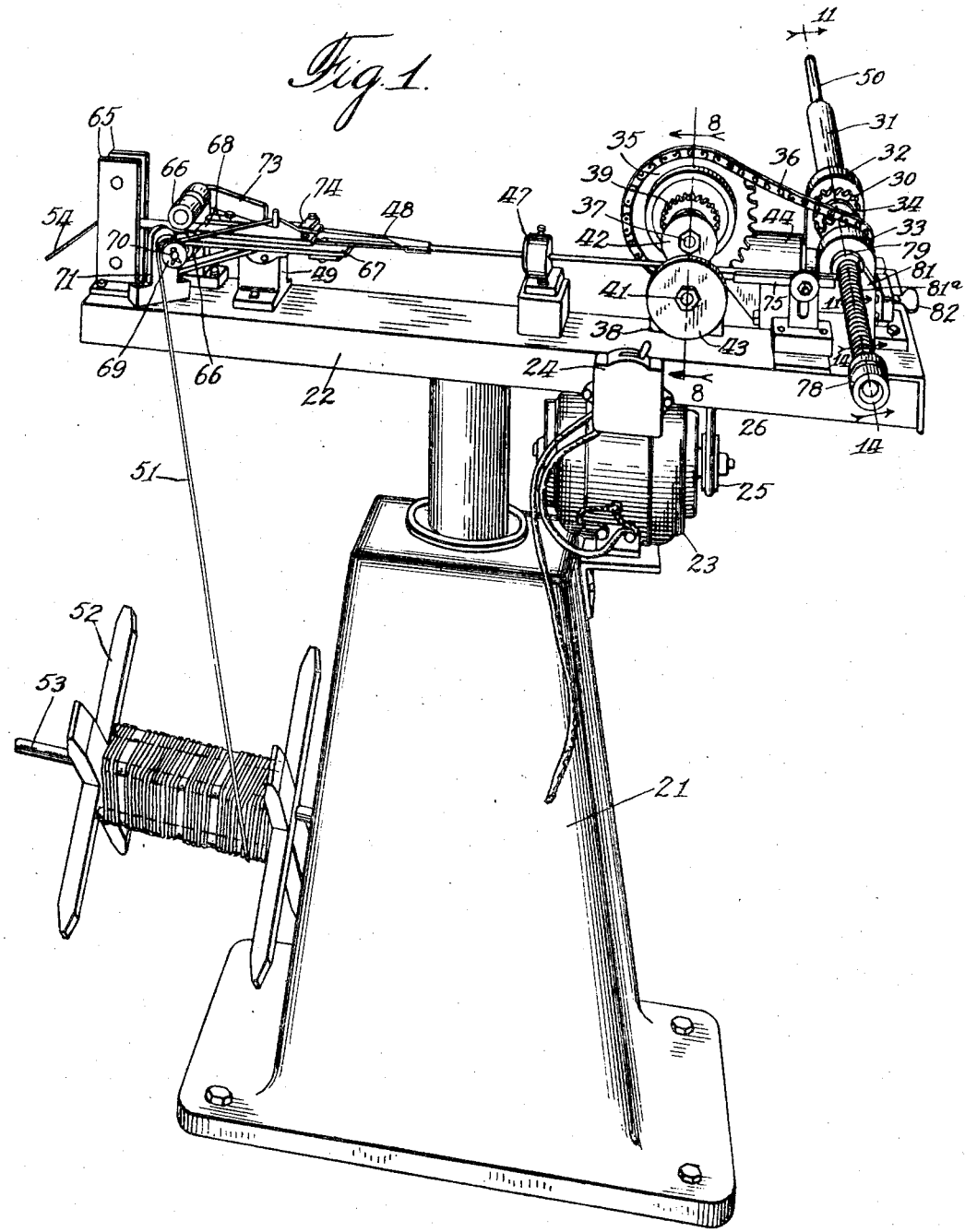
Figure 1 is a perspective view of a machine for manufacturing packing in accordance with the invention.

The machine shown in the drawings comprises a pedestal member 21 adapted to be secured to the floor and to support a substantially L-shaped base or table member 22 which carries the operating parts of the mechanism. Said mechanism is preferably driven by an electric motor 23 supported by the pedestal member 21 and controlled by a manually-operable switch 24. The motor 23 is provided with a pulley 25 from which a belt 26 extends to a pulley 27 secured to one end of a shaft 28 which carries near its opposite extremity a worm 29 meshing with a worm wheel 30. The worm wheel 30 is secured to a sleeve 31 supported in suitable journal members 32 and 33, which in turn are supported upon the base or table member 22. The sleeve 31 also has secured thereto a sprocket wheel 34 from which another sprocket wheel 35 is driven by means of a chain 36. The sprocket wheel 35 is secured to a shaft 37 which is suitably journalled in a supporting member 38, which in turn is supported upon the base or table member 22. The shaft 37 also has secured thereto a spur gear 39 which intermeshes with a second spur gear 40 secured to a second shaft 41, which is also journalled in the supporting member 38. The ends of the shafts 37 and 41 which project through the supporting journal member 38, respectively have secured thereto die members 42 and 43.

The shaft 28 is also journalled in a supporting member carried by the table or base member 22, said journal member being designated by the reference character 44. The worm 29 and wheel 30 are suitably lubricated by lubricant contained in a semi-cylindrical pan 45 supported immediately below the worm 29.

A die member 46 may also be provided and is carried by a supporting member 47, which is also supported from the base or table member 22. Both the die member 46 and the die members 42 and 43 are utilized in the forming and shaping of packing material consisting of a core of fibrous material, or the like, and a covering of metallic foil. Such foil is folded around the core by means of a stationary folder 48 which is also supported from the base or table member 22 by means of a supplemental supporting member 49. The packing material is drawn through the folder 48 and the dies 46, 42 and 43 by reason of the same being wound upon a shaft or rod 50 which is rotated by the power-driven sleeve 31 in a manner hereinafter described in detail. The feeding of this material may also be facilitated by the action of the power-driven rotary dies 42 and 43. The material which is drawn through the machine in this manner comprises a core 51 of fibrous material, or the like, which is taken from a supply reel 52 which is pivotally carried by a shaft or rod 53 projecting from one side of the pedestal member 21. This material also comprises a plurality of thicknesses of metallic foil to be wrapped around the core member. Any desired number of thicknesses of foil 54 may be used and are taken from supply rolls which are pivotally supported upon pins 55, 55 projecting from an upright support 56, as shown in Fig. 3. The support 56 may be carried by any suitable base member 57 which may rest upon the floor as shown, or which may be made rigid with the pedestal member 21 if desired. One or more of the strips of foil 54 is preferably drawn through a supply of graphite solution or other lubricating material for packing of the desired character. For this purpose the bottom or outermost strip of foil is shown in Fig. 3 as being taken from a supply roll pivotally carried by a pin 58 disposed in a vertically-slotted support 59 within a pan or tank 60 containing the desired graphite material or the like, as indicated at 61. Due to the manner of supporting the pin 58, the bottom of the supply roll of foil carried thereby rests upon the bottom of the pan and sufficient friction is thereby provided to retard the rotation of the supply roll somewhat. This prevents the foil strip 54 from being fed off the supply roll at too great a rate, whereby an excessive slack might occur in the strip extending to the machine. The rotation of the supply rolls carried by the pins 55 is retarded in a similar manner and for the same purpose by means of brake straps 62, as shown. One end of each of these straps is secured to a bracket member 63, which in turn is secured to the supporting member 56, and the other end of each of these straps is provided with a small weight 64. The foil strips are taken off from the bottoms of the supply coils carried by the pins 55 and the brake straps 62 extend over the tops of the supply rolls and are held thereagainst by the weight 64 in such manner that sufficient friction is obtained to provide the desired retarding action.

The foil strips 54 are drawn between upright vertical guides 65, 65 and then between horizontal rollers 66, 66 all of which are supported from the base or table member 22. After passing between the rollers 66, 66 the foil strips are drawn along a flat table-like member 67 between adjustable edge guiding strips 68, 68 and thence into the folding member 48. The members 67 and 68 are carried by the supplemental supporting member 49 and it is through the member 67 that the folding member 48 is supported by said supplemental supporting member. The core material 51 is drawn over a grooved wheel 69 which is loosely and pivotally supported by a pin 70 carried by a small pedestal member 71 which is also secured to the base or table member 22. This core material is then drawn through a slot in a stationary guiding member 73 which is carried by the supporting member for the rollers 66, 66 and thence through the grooved end of an offset guiding member 74 carried by one of the edge guiding strips 68 for the foil strips 54. The somewhat circuitous path through which the core material 51 is drawn in this manner provides the necessary friction for preventing excessive slack in the material as it enters the machine.

As the core material 51 and the covering strips 54 of metallic foil are drawn through the folding member 48, the covering strips are gradually formed around the core, three successive stages of which are illustrated in Figs. 5, 6 and 7. As shown in these figures the covering material is inter-leaved between convolutions of the folding member 48 as the material approaches the right hand end of this member as viewed in Fig. 1. When the foil strips have been completely folded around the core the composite packing material is preferably drawn through the stationary die 46 which effects preliminary formation and compression of the packing material. This material is then drawn through the driven rotating dies 42 and 43, the former of which is in the form of a disc and the latter a grooved wheel, into the groove of which the disc 42 extends. The periphery of the disc 42 and the bottom of the groove in the wheel 43 may be roughened, if desired, to facilitate the feeding of the packing material thereby, due to the gripping action which these dies exert upon the material. The sizes of the dies 42 and 43 are such that the feeding action thereof is effected at the same speed that the packing material is wound upon the rod 50. These dies 42 and 43 are so formed and disposed that the packing material is tightly compressed therebetween and formed into substantially square cross section. After leaving these dies the packing material is drawn through a groove 75a in an adjustable, stationary guiding member 75 which is shown in detail in Fig. 9. This guiding member is so adjusted in position that the packing material is guided thereby from the dies 42 and 43 into the proper position to be wound upon the rotating rod 50.

The rod 50 is rotated from the power driven sleeve 31 by means of a keyed collar member 76 which is shown in detail in Fig. 12. This collar is inserted in the right hand end of the sleeve 31 as viewed in Fig. 2 and is secured therein by means of a set screw 77, this construction being shown in detail in the sectional view of Fig. 11. The interior of the collar member 76 is formed with a key portion 76a adapted to fit a key-way slot 50a extending the entire length of the rotating rod 50 whereby this rod may be rotated with the sleeve 31, but may move longitudinally with respect thereto.

When the machine is to be started in operation the packing material is drawn through the various parts of the machine to a point adjacent the end of the rod 50 which projects through the journal member 33. The free end of the material is then wound in a few turns around the projecting end of the rod 50 and is clamped thereto by means of a clamping sleeve 78 as shown in detail in Fig. 14. The interior of this sleeve is preferably tapered slightly so that it may be forced over the turns of packing material to clamp the same firmly on the end of the rod 50. Then as the motor 23 is started the rod 50 is rotated through the connections above described and the packing material is wound upon the rod and thereby drawn through the various parts of the forming mechanism, with the assistance of the power driven rotating dies 42 and 43. The winding of the packing material upon the rod 50 is guided by the guiding member 75, the end of which is offset adjacent the rod 50 as indicated at 75b. The angle of this offset portion is such as to conform to the spiral formation of the packing material as it is wound upon the rod 50. The proper positioning of the successive coils of material on the rotating rod is also governed by a spiral guiding member 79, formed on the end of a sleeve secured in the journal member 33 by means of a set screw 80.

The guiding sleeve 79 serves as a journal support for the rod 50, while the keyed collar 76 at the opposite end of the driving sleeve 31 serves as a support for the rod at that point permitting longitudinal sliding movement of the rod with respect thereto.

In order that the packing material may be turned out in coils of any desired diameter, within certain limits, a plurality of the rods 50 of different diameters may be utilized. The use of a larger rod, for example, will provide coils of correspondingly increased diameter and simply necessitates the use of a driving collar 76 and a guiding member 79 of a larger bore. The stationary guiding member 75 may be adjusted to guide the packing material from the dies 42 and 43 to the desired position adjacent a rod 50 of any desired diameter. For different sizes of rods the dies 42 and 43 may be interchanged with dies providing the suitably increased or decreased rate of feed and where it is necessary to use a die 42 having a diameter different from that of the bottom of the groove in the die 43, only one of these dies may be roughened to exert the desired feeding action while the packing material is permitted to slip freely over the cooperating die surface. It will also be understood that the die 46 is readily replaceable and that a die of any suitable size may be used at this point to form packing of any desired cross sectional size and shape. The dies 42 and 43 and the guiding member 75 may also be interchanged to accommodate the desired size and shape of packing.

A further guiding and forming member 81 may be adjustably mounted on the journal member 33 and formed with a concave cylindrical portion 81a to be pressed against the turns of packing material that are wound upon the rod 50. Such a guiding and forming member may be adjusted by means of a thumb screw 82 to bear firmly against the turns of packing material whereby the latter is tightly coiled upon and pressed against the rod to produce coiled packing material of the desired firmness and accuracy of dimensions.

In preparing the machine for operation, a driving collar 76 and a guiding sleeve 79 of the proper bore to fit a rod 50 of the desired diameter are secured in the end of the driving sleeve 31 and in the journal member 33, respectively, and the rod 50 is then inserted therein with its end projecting only a short distance beyond the guiding sleeve 79. When the first few turns of the packing material have been wound around the rod and the clamping sleeve 78 has been forced over the same, the motor 23 is started and the material is wound upon the rod, which latter is caused to move gradually to the left, as viewed in Fig. 2, as the turns of the material are brought into place by the guiding members 75, 79, and 81. When the righthand end of the rod has nearly reached the projecting end of the sleeve 31, or when a sufficient number of turns of the packing material have been wound upon the rod, the operation of the machine is stopped and one of the turns of the packing material is severed near the point where it is being wound onto the rod by the action of the above mentioned guiding members. The clamping sleeve 78 is then removed and the coil of material which is thus released is removed from the rod 50 in any suitable manner. A convenient way of doing this is to place a rod of the same, or slightly smaller diameter, in abutting relation to the outer end of the rod 50 and then to force the latter back through the coil of packing material to a position where its lefthand end has passed slightly beyond the point where the packing material was severed. The completed coil of material is then conveniently disposed upon the auxiliary rod by means of which the rod 50 was pushed back to its initial position. Such an auxiliary rod may suitably be a wooden rod, and the projecting end of the driven rod 50 may be provided with a small pointed projection 83, as shown in Fig. 11, whereby the auxiliary rod may be readily centered with respect thereto. The auxiliary rod of course will be provided with a small bore in its end to receive the projection 83. When the rod 50 has been pushed back during or following the removal of the coils of packing material, it is ready to have the clamping sleeve 78 again forced over the few remaining turns of packing material and the machine is then ready to resume its operation.

After the completed coil of packing material is removed from the rod 50, it may be cut up into sections of one or more turns each for formation into rings of the desired axial length. The cross-sectional appearance of the material as it leaves the machine is indicated in Fig. 15, which illustrates the manner in which the metallic foil strips 54 have been folded around the core 51 and the latter formed and compressed to produce a packing material of the desired size and shape. The coils of material of this size and shape may then be additionally formed and compressed by punch dies to obtain the exact dimensions and shapes required. A completed ring which has been finally formed in this manner is illustrated in Fig. 16. As shown in this figure, the rings may be formed with tapered or other surfaces to fit any desired type of packing glands or the like. Due to the nature of the core material 51 and that of the thin metallic foil covering 54, the packing material is susceptible of formation into any desired shape and the completed rings are of such nature that they may be used to form absolutely fluid-tight joints in any desired type of construction. The material has the advantages of both fibrous and metallic packings and many of the disadvantages of these two types are not encountered. The material is substantially impregnated with the graphite solution or other lubricating medium through which one or more of the strips of the foil covering are drawn in the manner illustrated in Fig. 3 and hereinbefore described. Tight joints may therefore be provided without involving any substantial friction between rotating parts and the like.

The material used for the core of the packing of this type may be relatively inexpensive, as it is fully protected by its metallic covering. It is well known that fibrous materials deteriorate rapidly when they come in contact with various liquids, acids, vapors, etc., but these disadvantages are eliminated in the packing of the present invention because the fibrous core is protected by the metallic covering.

For ordinary uses the core material may be any inexpensive fibrous material, such as cotton, hemp, jute, felt, etc., and the metallic covering of the packing may be formed of lead foil. For high temperature service non-burning materials may be used, such as asbestos for the core and a covering of aluminum foil or the like.

From the foregoing it will be seen that the present invention provides a machine for making an improved type of packing material.

While only certain specific embodiments of the invention have been shown and described herein, it will be readily understood by those skilled in the art that various changes and modifications in the details of construction and arrangement of parts may be made without departing from the spirit and scope of the invention as set forth in the appended claims.

What is claimed as new and is desired to secure by Letters Patent, therefore, is:

1. A machine for making packing material and the like comprising means for receiving continuous lengths of metallic foil strip and continuous lengths of fibrous core material in substantially parallel relation and folding the foil longitudinally around the core so that it forms a sheath extending parallel to the core, means for continuously drawing said foil strips and core material through said folding means, and forming means operating upon the composite material to render the same of predetermined cross-sectional shape and size.

2. A machine for making packing material and the like comprising means for receiving continuous lengths of metallic foil strip and continuous lengths of fibrous core material in substantially parallel relation and folding the foil longitudinally around the core so that it forms a sheath extending parallel to the core, means for continuously drawing said foil strips and core material through said folding means comprising a rotating member upon which the finished packing is wound in coil formation, and a power-driven rotating die engaging the material beyond said folding means and assisting in the feeding of the material.

3. A machine for making packing material and the like comprising means for receiving continuous lengths of metallic foil strip and continuous lengths of fibrous core material in substantially parallel relation and folding the foil longitudinally around the core so that it forms a sheath extending parallel to the core, means for continuously drawing said foil strips and core material through said folding means comprising a rotating member upon which the finished packing is wound in coil formation, and a power-driven rotating die engaging the material beyond said folding means to form and compress the metal-covered core and assisting in the feeding thereof.

4. A machine for making packing material and the like comprising means for receiving continuous lengths of metallic foil strip and continuous lengths of fibrous core material in substantially parallel relation and folding the foil longitudinally around the core so that it forms a sheath extending parallel to the core, means for continuously drawing said foil strips and core material through said folding means comprising a rotating member upon which the finished packing is wound in coil formation, and a pair of cooperating, power-driven rotating dies engaging the material beyond said folding means and assisting in the feeding of the material.

5. A machine for making packing material and the like comprising means for receiving continuous lengths of metallic foil strip and continuous lengths of fibrous core material in substantially parallel relation and folding the foil longitudinally around the core so that it forms a sheath extending parallel to the core, means for continuously drawing said foil strips and core material through said folding means comprising a rotating member upon which the finished packing is wound in coil formation, a pair of cooperating, rotating dies engaging the material beyond said folding means to form and compress the metal-covered core and assisting in the feeding thereof, and means for driving said drawing means and said rotating dies at predetermined relative speeds.

6. A machine for making packing material and the like comprising means for receiving continuous lengths of metallic foil strip and continuous lengths of fibrous core material in substantially parallel relation and folding the foil longitudinally around the core so that it forms a sheath extending parallel to the core, means for continuously drawing said foil strips and core material through said folding means comprising a rotating member upon which the finished packing is wound in coil formation, a pair of cooperating, rotating dies engaging the material beyond said folding means to form and compress the metal-covered core and assisting in the feeding thereof, and common power means for driving said drawing means and said rotating dies at predetermined relative speeds.

7. A machine for making packing material and the like comprising means for guiding and forming the material in continuous lengths and means for drawing the material through said guiding and forming means comprising a rotatable rod upon which said continuous lengths of material are adapted to be wound in coil formation and a driving member for rotating said rod but permitting axial movement thereof whereby said material may be coiled up along the length of the rod.

8. A machine for making packing material and the like comprising means for guiding and forming the material in continuous lengths and means for drawing the material through said guiding and forming means comprising a rotatable rod upon which said continuous lengths of material are adapted to be wound in coil formation and a driving sleeve having a key-and-slot connection with said rod for rotating the same but permitting relative axial movement between the rod and sleeve whereby said material may be coiled up along the length of the rod.

JOHN T. CRANE.